United States Patent [19]

Evels et al.

[11] Patent Number: 5,419,479
[45] Date of Patent: May 30, 1995

[54] TRANSVERSE CARRIER CLAMP FOR ROOF LUGGAGE CARRIER FOR AUTOMOTIVE VEHICLES WITH ROOF RACK

[75] Inventors: Brigitte Evels, Wuppertal; Harald Brunner, Solingen; Gerrit Flüss, Wuppertal, all of Germany

[73] Assignee: Happich Fahrzeug-Dachsysteme GmbH, Germany

[21] Appl. No.: 229,556

[22] Filed: Apr. 19, 1994

[30] Foreign Application Priority Data

May 6, 1993 [DE] Germany .................. 43 15 024.1

[51] Int. Cl.⁶ .............................................. B60R 9/00
[52] U.S. Cl. .................................. 224/321; 224/309; 224/319; 224/322; 224/331; 248/316.5; 403/DIG. 9
[58] Field of Search ................ 224/309, 315, 319, 320, 224/321, 322, 323, 325, 326, 330, 331; 248/316.1, 316.5, 316.6, 503, 689; 403/233, 234, 236, 373, DIG. 9, 321, 322

[56] References Cited

U.S. PATENT DOCUMENTS

| | | | |
|---|---|---|---|
| 3,270,994 | 9/1966 | Machan et al. | 248/316.5 |
| 4,273,278 | 6/1981 | Storm | 224/321 |
| 4,445,657 | 5/1984 | Breckenridge | 248/316.5 |
| 4,489,869 | 12/1984 | Wienhold et al. | 224/321 |
| 4,877,169 | 10/1989 | Grim | 224/320 |
| 4,892,276 | 1/1990 | Alessio | 248/316.5 |
| 5,226,570 | 7/1993 | Pedrini | 224/315 |
| 5,275,320 | 1/1994 | Duemmler | 224/331 |

FOREIGN PATENT DOCUMENTS

| | | | |
|---|---|---|---|
| 487132 | 5/1992 | European Pat. Off. | 224/331 |
| 2804588 | 8/1979 | Germany . | |
| 3408870 | 9/1985 | Germany | 224/324 |
| 3510805 | 10/1986 | Germany . | |
| 3626479 | 2/1988 | Germany | 224/321 |
| 9015530 | 3/1991 | Germany . | |
| 4001546 | 7/1991 | Germany | 224/331 |
| 4108058 | 9/1992 | Germany . | |
| 14523 | 9/1890 | United Kingdom | 224/30 R |
| 2111585 | 6/1983 | United Kingdom | 403/DIG. 9 |
| 9002668 | 3/1990 | WIPO | 224/326 |

*Primary Examiner*—Henry J. Recla
*Assistant Examiner*—Gregory M. Vidovich
*Attorney, Agent, or Firm*—Ostrolenk, Faber, Gerb & Soffen

[57] ABSTRACT

A roof luggage carrier for an automotive vehicle includes a pair of rails running the length of the vehicle and at least one transverse carrier extending between the rails. A clamping device at each end of the carrier clamps the respective rail. The carrier is a hollow section with an open channel on its bottom. The clamping device includes a support jaw held stationary on the carrier and positioned on the side of the rack pipe toward the outer side of the vehicle. A swingable clamping jaw cooperates with the support jaw to clamp the pipe between them. The clamping jaw is positioned on the side of the pipe toward the middle of the vehicle. The clamping jaw is a double arm lever swingable around a pivot pin that is supported on the support jaw. The upper parts of both the support jaw and the clamping jaw extend through the longitudinal opening in the carrier and into the interior of the carrier. An adjustable screw in the upper part of the support jaw is movable to abut and move the upper part of the clamping jaw to swing the lower part of the clamping jaw to clamp against the pipe.

13 Claims, 5 Drawing Sheets

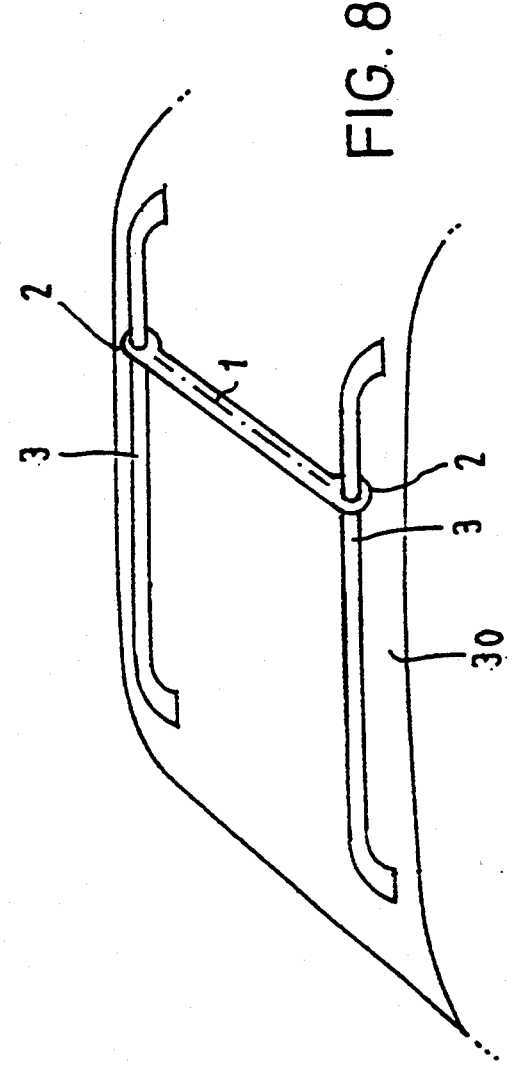

TRANSVERSE CARRIER CLAMP FOR ROOF LUGGAGE CARRIER FOR AUTOMOTIVE VEHICLES WITH ROOF RACK

BACKGROUND OF THE INVENTION

The present invention refers to a roof luggage carrier for automotive vehicles and particularly to a device for clamping a transverse carrier or bar to the roof pipes extending along the sides of the roof. One roof luggage carrier type is comprised of two rack pipes extending along the sides of the roof and a transverse carrier between the pipes. A detachable clamping device clamps the transverse carrier to the pipes.

In a roof rack of this type in Federal Republic of Germany DE 41 08 058 C1, support jaws and clamping jaws attach the transverse carrier to a rack pipe. The support jaws are fixed on the transverse carrier toward the center of the vehicle, while the clamping jaws are located toward the outside of the vehicle. Each of the jaws is displaceable on the transverse carrier by use of a clamping bolt. By tightening the clamping bolts, the displaceable clamping jaws are pulled against the support jaws with the rack pipe between the jaws, for attaching the transverse carrier to the rack pipes.

It has been found that the clamping devices provided in the known roof luggage carriers do not adequately satisfy technical requirements. A first disadvantage is that the jaws cannot grasp any shape cross-sections of the carrier or rack pipe, but must be adapted to the cross-section of the specific rack pipe. Another disadvantage is that the clamping force obtainable is not always sufficient for absolutely dependable attachment of the transverse carrier to the rack pipes. This is due to the unfavorable condition of leverage of the clamping bolts with respect to the effective regions of the jaws on the rack pipes, which does not permit optimal transmission of force. Experiments have shown that upon tightening of the clamping bolts, a relatively large bending moment is exerted on them due to the unfavorable leverage conditions. As a result, the displaceable clamping jaws may jam and cant. As a result of that, the clamping force introduced into the clamping bolts arrives finally only partially as a clamping force acting on the rack pipe.

SUMMARY OF THE INVENTION

Therefore, the primary object of the present invention is to develop a luggage carrier of the aforementioned type, to make it possible to attach the transverse carrier to any cross-sectional shape of the rack pipes and to assure optimal transmission of the force which is necessary for dependable attachment of the transverse carrier to the rack pipes.

A roof luggage carrier for an automotive vehicle includes a pair of rails running the length of the vehicle and at least one transverse carrier extending between the rails. A clamping device at each end of the carrier clamps the respective rail. The carrier is a hollow section with an open channel on its bottom. The clamping device includes a support jaw held stationary on the carrier and positioned on the side of the rack pipe toward the outer side of the vehicle. A swingable clamping jaw cooperates with the support jaw to clamp the pipe between them. The clamping jaw is positioned on the side of the pipe toward the middle of the vehicle. The clamping jaw is a double arm lever swingable around a pivot pin that is supported on the support jaw. The upper parts of both the support jaw and the clamping jaw extend through the longitudinal opening in the carrier and into the interior of the carrier. An adjustable screw in the upper part of the support jaw is movable to abut and move the upper part of the clamping jaw to swing the lower part of the clamping jaw to clamp against the pipe.

The clamping jaws of the clamping devices are developed as swingably mounted clamping levers which permit a particularly favorable transmission of force with practically a 1:1 ratio. A closed force system is formed by the swingably mounted clamping levers. As a result, regardless of its cross section, a rack pipe always finds support between the clamping elements at three points. Another advantage is that the clamping devices can be mounting units ready for installation.

Other features and advantages of the present invention will become apparent from the following description of the invention which refers to the accompanying drawings.

BRIEF DESCRIPTION OF THE DRAWINGS

One embodiment of the invention is explained below with reference to the drawings, in which:

FIG. 8 schematically illustrates a roof luggage carrier with two rack pipes.

DETAILED DESCRIPTION OF THE INVENTION

Figure 1:
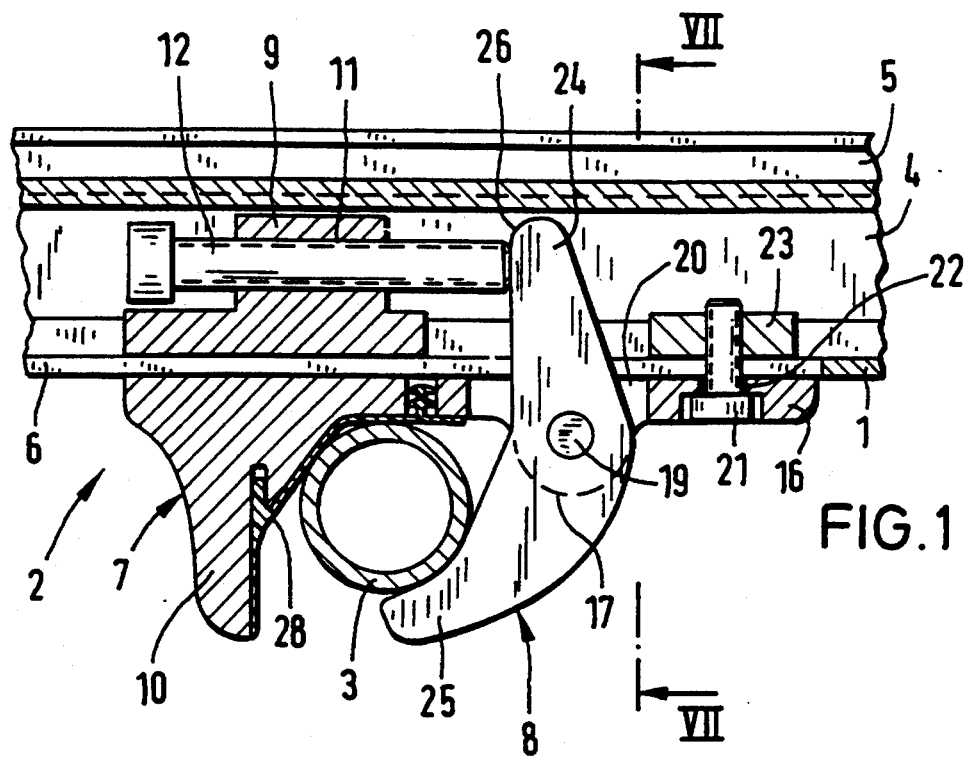
FIGS. 1 to 6 show longitudinal sections through a transverse carrier of a roof luggage carrier in the region of a detachable clamping device adapted to clamp onto various size and shape luggage carrier roof rack pipes.
Figure 2:
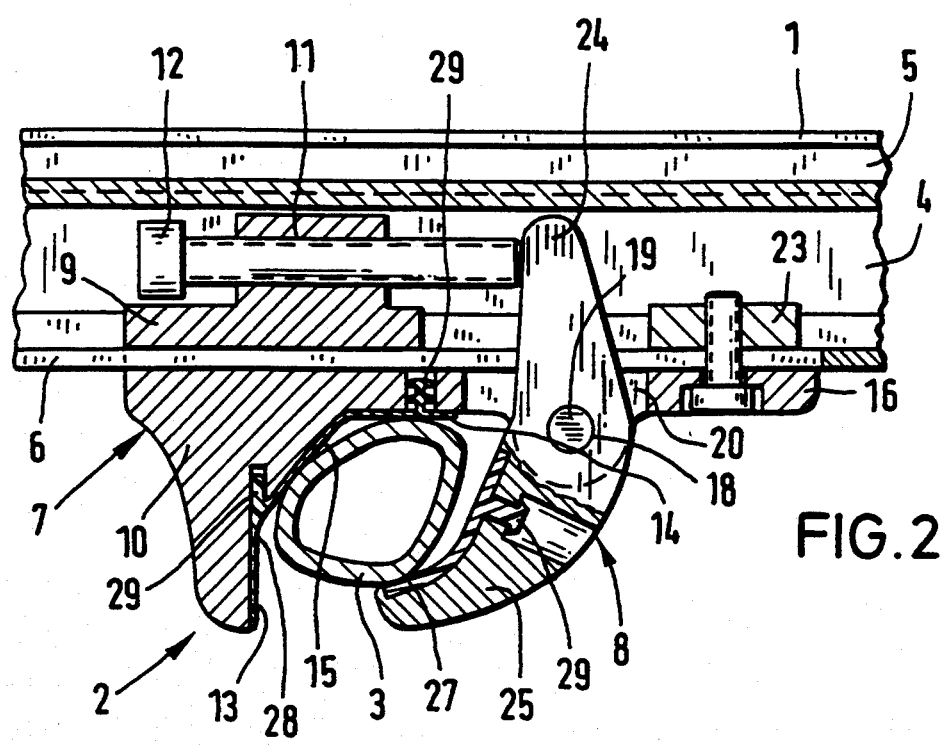
Figure 3:
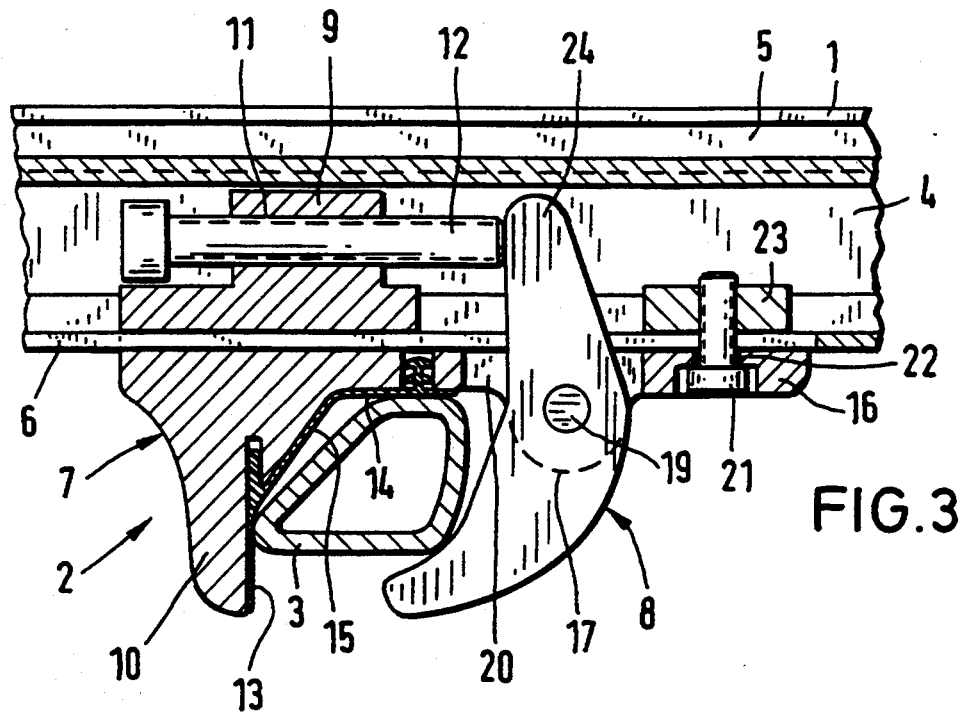
Figure 4:
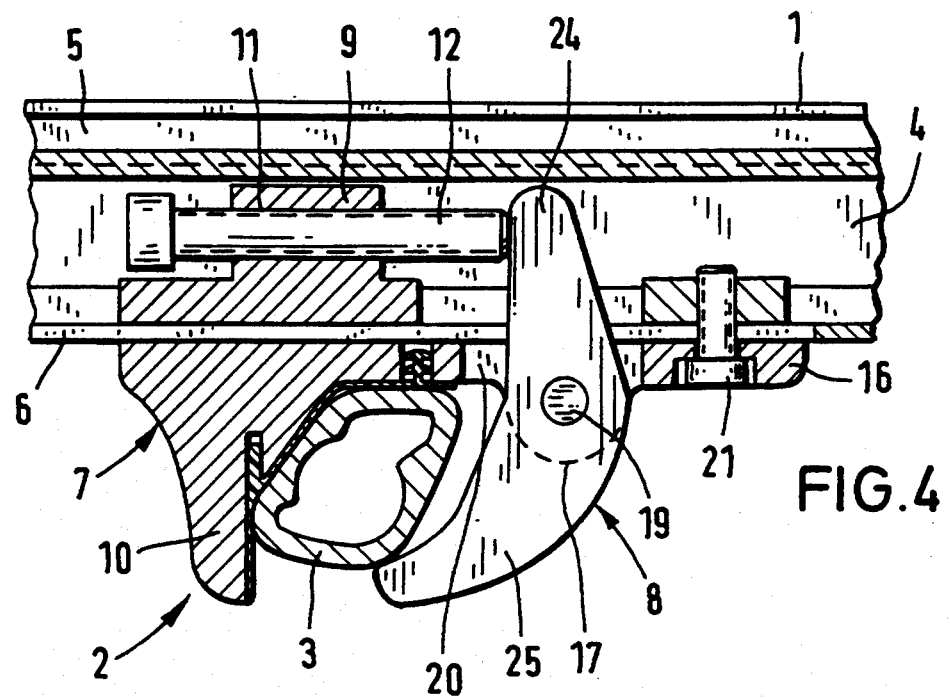
Figure 5:
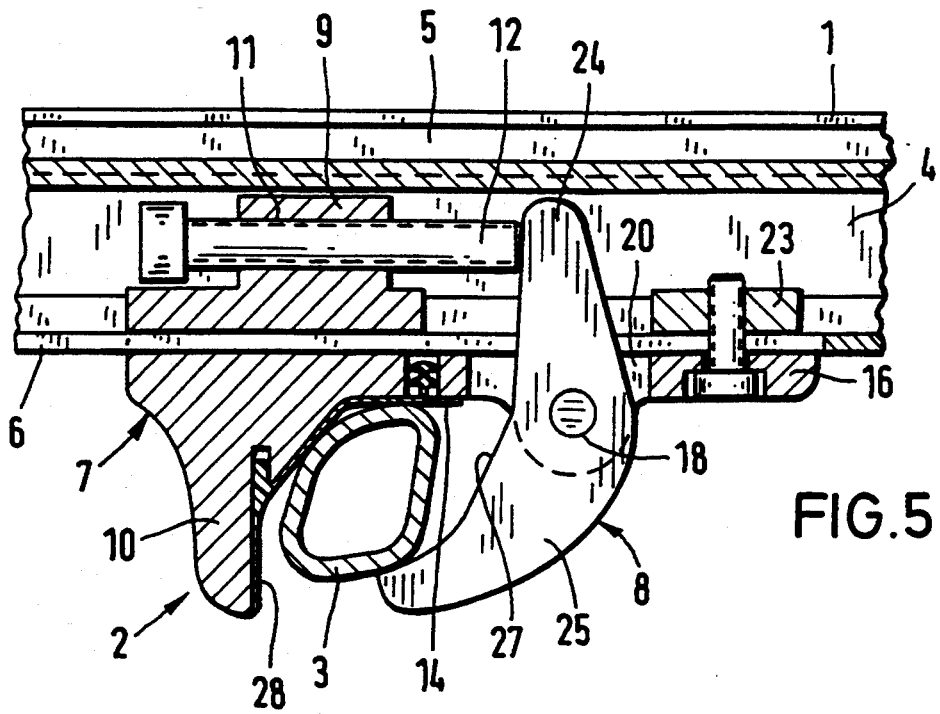
Figure 6:
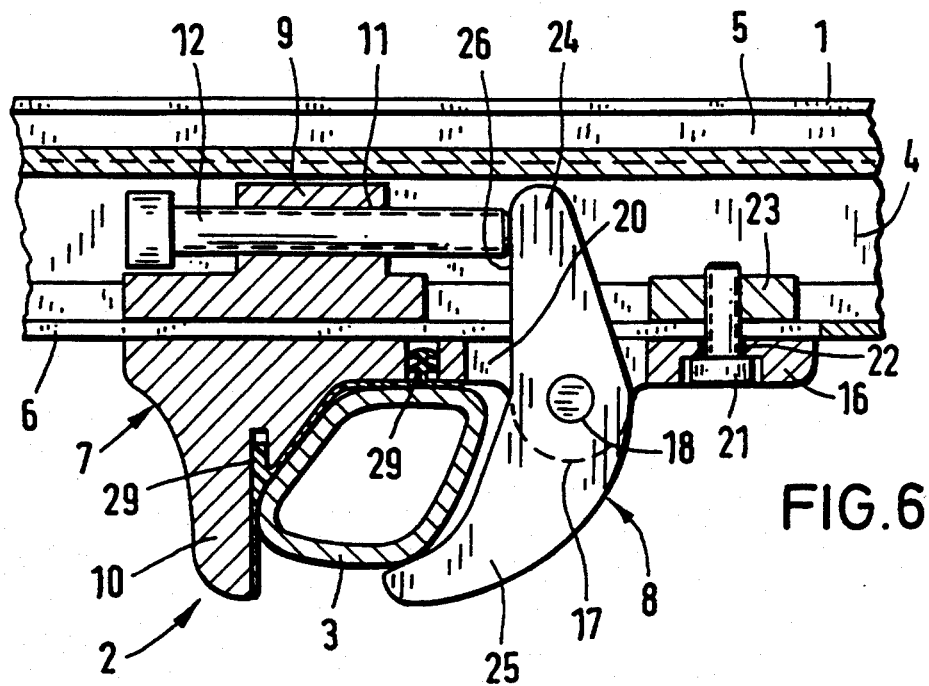
Figure 7:
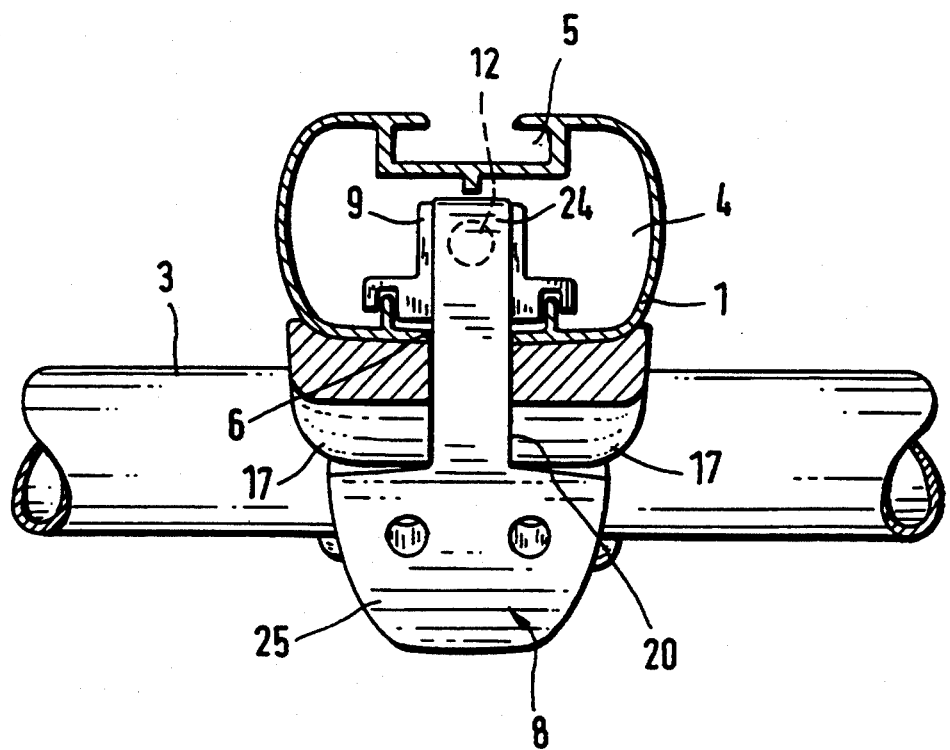
FIG. 7 is a cross section approximately along the line VII—VII of FIG. 1.

Each of FIGS. 1 to 6 shows a lateral region of a roof luggage carrier for an automotive vehicle having a roofs rack (as in FIG. 8). The roof luggage carrier is essentially comprised of at least one and more typically a plurality of transverse carriers 1. Each carrier has a clamping device 2 for attachment to a rack pipe 3 on one side of the vehicle roof. One pipe 3 is shown in FIG. 1-6. As is conventional, there is another pipe on the other side of the roof 30 (see FIG. 8). The embodiments of the invention shown in FIGS. 1 to 6 differ merely by different cross-sectional profiles of the rack pipes 3 and the resulting different position of the clamping device elements which are caused by the respective roof rack pipe cross-sections. Therefore, only the clamping embodiment shown in FIG. 1 is described. That description also applies to FIGS. 2 to 6.

The transverse carrier 1 is a hollow tube or section with a longitudinal channel 4 extending along its bottom and a top longitudinal channel 5 which is open toward the top of the carrier. In the lower wall of the longitudinal channel 4, a longitudinal slot 6 is defined approximately at the center of the tube and at both end regions of the transverse carrier 1.

The clamping device 2 comprises a support jaw 7 and a clamping jaw 8. The support jaw 7 is located on the side of the rack pipe 3 which is toward the outer side of the vehicle. The jaw 7 has an upper jaw part 9 which is arranged in the lower longitudinal channel 4 and a lower jaw part 10 which extends downward below the transverse carrier 1. The jaw parts 9 and 10 are connected integrally to each other by an arm which is displaceably guided in, for movement along, the slot 6. The upper jaw part 9 has a hole 11 through it, which extends parallel to the transverse carrier 1 and is provided with an internal thread. A screw 12 is turnable within the hole 11 and is thus guided for longitudinal movement. As an alternative to the threaded opening, a hexagon nut inserted in a pocket can also be provided in the upper jaw part 9 for receiving the screw 12.

The lower jaw part 10 has a plurality of three intersecting resting surfaces 13, 14, 15. The resting surfaces 13 and 14 are approximately perpendicular to each other, while the resting surface 15 has an oblique intersection with and is between the other two resting surfaces. A rack pipe 3 of almost any cross-section comes into supported application against at least two of the resting surfaces 13, 14, 15.

The lower jaw part 10 further has an extension 16 which is directed toward the center of the vehicle. One side of the extension rests on the transverse carrier 1. On the side of the extension opposite the transverse carrier 1 two bearing supports 17 are seated, which are developed with bearing lugs 18 for a pivot pin 19. Between the bearing supports 17 there is a passage opening 20 which extends through the support jaw 7 and its extension 16. For fixing the axial position of the support jaw 7 on the transverse carrier 1 there is a fastening screw 21 which passes through a hole 22 in the free end region of the extension 16 and can be screwed into the threaded hole of a clamping element 23 which is inserted in the lengthwise channel 4.

The clamping jaw 8 is located on the side of the pipe 3 toward the center of the vehicle. That jaw is developed as a double armed lever which is swingable approximately around its center around the horizontally directed pivot pin 19 which is supported on the support jaw 7 and extends transversely to the carrier 1. The clamping jaw 8 includes an upper jaw part 24 which passes through the passage opening 20 in the extension 16 of the support jaw 7. The clamping jaw 8 includes a lower jaw part 25 which is developed as a yoke part having a side which faces the support jaw 7 and which can be applied against a rack pipe 3. On the upper jaw part 24 of the clamping jaw 8 there is an abutment surface 26 for the free end of the screw 12.

Loosening the screw 12 enables the lower jaw part 25 of the clamping jaw 8 to be swung away from the support jaw 7 so that the clamping device 2 can be placed on or removed from a rack pipe 3. Tightening of the screw 12 moves its free end against the abutment surface 26 of the clamping jaw 8 so that the jaw 8 swings around the pivot pin 19 and so that its lower jaw part 25 is pressed against the corresponding rack pipe 3. The drawing shows a favorable lever ratio which produces an optimal transmission of force from the screw 12 to the rack pipe 3.

By the special development of the lower jaw part 9 of the support jaw 7 and particularly by the development and swingable mounting of the clamping jaw 8, a clamping device of universal use is created which is capable of clamping on to a rack pipe of almost any cross-section, as is shown, although only by way of illustration, in FIGS. 1 to 6.

In order to avoid clamp markings on the rack pipe, the regions of the clamping device 2 that are applied against the rack pipe 3 bear softer material covering 27, 28 which are softer than the remaining material of the jaws. These coverings 27, 28 can consist of extruded moldings of, for instance, EPDM. They have detent pins 29 formed on them for engagement in corresponding holes in the lower jaw parts 10 and 25. In this way, simple and inexpensive manufacture and mounting of the coverings 27, 28 is obtained. The coverings are on the surfaces of the jaws where they contact the pipe.

The entire clamping device 2, together with all of its individual parts, is a preassembled unit, ready for installation, which need merely be inserted into the transverse carrier 1 and fastened.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A roof rack for an automotive vehicle, wherein the roof rack comprises a rack pipe adapted to be connected to the roof of the vehicle extending lengthwise on the length of the roof and a transverse carrier extending transversely to the rack pipe, the transverse carrier having an end region;

a detachable clamping device connected at the end region of the carrier for fastening the carrier to the rack pipe, the clamping device including a support jaw and a clamping jaw; with respect to the roof of the vehicle and the respective pipe clamped by the clamping device, the support jaw lies on the side of the pipe toward the outside of the vehicle and the clamping jaw lies on the side of the pipe toward the middle of the vehicle;

the support jaw being located on the carrier such that the support jaw abuts the rack pipe, said support jaw including an upper jaw part extending within the carrier and a lower jaw part extending below the carrier; a clamping jaw moving means received at the upper jaw part for moving the clamping jaw;

the clamping jaw comprising a lever having an upper part disposed for being engaged by the clamping jaw moving means which is supported to be movable with respect to the support jaw upper part and a lower part which is movable with respect to the lower part of the support jaw for clamping the pipe between the support jaw and clamping jaw lower parts upon operation of the clamping jaw moving means in a direction to move the clamping jaw upper part to clamp the pipe between the clamping jaw and the support jaw lower parts;

a pivot pin mounted on the support jaw for pivotally supporting the lever thereon wherein the clamping jaw upper part is located above the pin and the lower part is located below the pin, and with the upper part of the clamping jaw being engageable with the clamping jaw moving means which pivotally moves the upper part of the lever and the lower part of the clamping jaw having a side which clamps to the pipe.

2. The luggage carrier of claim 1, wherein the means for moving the clamping jaw comprises a threaded opening in the upper part of the support jaw, a bolt passing through the threaded opening and engaging the upper part of the clamping jaw such that rotation of the screw bolt in the support jaw adjusts the pivot position of the clamping jaw upper and lower parts for selectively clamping the clamping jaw lower part against the pipe.

3. The luggage carrier of claim 1, wherein the rack comprises a pair of rack pipes extending along the roof, the transverse carrier extending between the pipes; a respective one of the clamping devices being positioned along the carrier at each of the pipes for clamping the carrier to the pipe.

4. The luggage carrier of claim 1, wherein the transverse carrier comprises a hollow section with a longitudinal slot therein opening to a bottom side of the carrier; the support jaw upper part extending into the hollow section of the carrier through the longitudinal slot;

the upper part of the clamping jaw passing through a passage opening in the support jaw and also through the longitudinal slot in the carrier and into the hollow Section of the carrier; and the lower parts of the support and the clamping jaws extending downward from the carrier and below the slot.

5. The luggage carrier of claim 1, wherein the support jaw further includes an extension thereon extending along the carrier past the clamping jaw, the extension has a passage opening through it through which the upper part of the clamping jaw passes and the passage opening being sized so that the upper part of the clamping law can pivotally swing about the pivot pin.

6. The luggage carrier of claim 5, wherein the transverse carrier comprises a hollow section with a longitudinal slot therein opening to a bottom side of the carrier; the support jam upper part extending into the hollow section of the carrier through the longitudinal slot; the upper part of the clamping jaw passing through the passage opening of the support jaw and also through the longitudinal slot in the carrier; and the lower parts of the support and the clamping jaws extending downward from the carrier below the slot.

7. The luggage carrier of claim 5, wherein the pivot pin is mounted on the extension.

8. The luggage carrier of claim 7, wherein the extension of the support jaw has a side which abuts the transverse carrier and a side that faces away from the transverse carrier; said extension further having bearing supports extending therefrom on the side of the extension away from the transverse carrier and the pivot pin being mounted between and connected to the bearing supports; the passage opening in the support jaw through which the upper jaw part of the clamping jaw passes is located between the bearing supports.

9. The luggage carrier of claim 1, wherein the support jaw has a side facing toward the pipe for clamping the pipe, and the clamping jaw has a side facing toward the pipe for the clamping the pipe, wherein the facing jaw sides include regions which rest against the pipe and coverings on the regions made of a material adjacent the region which is softer than the material of the jaws for cushioning the contact with the pipe.

10. The luggage carrier of claim 1, wherein one of the jaws has a surface profile formed at various angles so that the surface profile thereof is adapted to engage pipe shapes of various cross-sections.

11. The luggage carrier of claim 10, wherein the surface profile of the one jaw is shaped to partially surround the pipe by including three successive surfaces around the pipe, the successive surfaces comprising two outer surfaces which are generally perpendicular to each other and a middle surface which intersects and joins the two outer surfaces.

12. The luggage carrier of claim 11, wherein the intersection of one end of the middle surface with one of the outer surfaces forms a first angle and the intersection of an opposite end of the middle surface with the other of the outer surfaces forms a second angle wherein the first and second angles are oblique.

13. The luggage carrier of claim 1, wherein the clamping jaw has a bent profile so as to engage the pipe and press it against the surface of the support jaw.

* * * * *